(12) United States Patent
Senoo et al.

(10) Patent No.: US 12,466,492 B2
(45) Date of Patent: Nov. 11, 2025

(54) VEHICLE FRONT PART STRUCTURE

(71) Applicant: TOYOTA JIDOSHA KABUSHIKI KAISHA, Toyota (JP)

(72) Inventors: Yuta Senoo, Toyota (JP); Myoungjun Kim, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 18/129,995

(22) Filed: Apr. 3, 2023

(65) Prior Publication Data
US 2023/0331311 A1 Oct. 19, 2023

(30) Foreign Application Priority Data

Apr. 13, 2022 (JP) ................................. 2022-066112

(51) Int. Cl.
*B62D 25/08* (2006.01)

(52) U.S. Cl.
CPC ................................ *B62D 25/081* (2013.01)

(58) Field of Classification Search
CPC .................. B62D 25/081; B62D 25/08; B60R 2021/343; B60R 21/34; B60R 2021/003; B60R 2021/0004
USPC ............. 296/192, 187.04, 84.1, 201, 187.09
See application file for complete search history.

(56) References Cited

U.S. PATENT DOCUMENTS

| | | | | |
|---|---|---|---|---|
| 2016/0023687 A1* | 1/2016 | Ichikawa | ............. | B62D 25/081 296/192 |
| 2016/0229459 A1* | 8/2016 | Ishihara | ................. | B62D 25/12 |
| 2016/0325787 A1* | 11/2016 | Matsumura | ............. | B60R 21/34 |
| 2019/0106078 A1* | 4/2019 | Nakamura | ........... | B62D 29/005 |

FOREIGN PATENT DOCUMENTS

| JP | 2005193873 A | * | 7/2005 |
|---|---|---|---|
| JP | 2006-240560 A | | 9/2006 |
| JP | 2006264538 A | * | 10/2006 |
| JP | 2009286322 A | * | 12/2009 |
| JP | 2013-184582 A | | 9/2013 |
| JP | 2015-024664 A | | 2/2015 |
| JP | 2016-101818 A | | 6/2016 |

* cited by examiner

*Primary Examiner* — Amy R Weisberg
*Assistant Examiner* — Denise Lynne Esquivel
(74) *Attorney, Agent, or Firm* — Dinsmore & Shohl LLP

(57) ABSTRACT

A cowl louver is placed below a cowl top which is an outer plate member on an upper surface of a front part of a vehicle body. The cowl louver has a vertical wall which extends vertically from a cowl panel toward an expected direction of a load F. The vertical wall is bent at one location between an upper edge and a lower edge, and a length from a ridgeline at the bent position to the upper edge (upper width), and a length from the ridgeline to the lower edge (lower width), differ from each other. During deformation of the vertical wall due to collision, the bent portion moves on the vertical wall 40 so that energy is continuously consumed and the shock is absorbed.

4 Claims, 2 Drawing Sheets

VEHICLE FRONT PART STRUCTURE

CROSS REFERENCE TO RELATED APPLICATION

This application claims priority to Japanese Patent Application No. 2022-066112 filed on Apr. 13, 2022, which is incorporated herein by reference in its entirety including the specification, claims, drawings, and abstract.

TECHNICAL FIELD

The present disclosure relates to a structure of a front part of a vehicle, and in particular to a structure for absorbing a shock load on a portion adjacent to a front edge of a windshield.

BACKGROUND

From a viewpoint of protection of pedestrians, a shock absorbing structure is provided at an upper portion of a front part of a vehicle such as, for example, a hood, a member placed between the hood and a windshield, or a member placed below these members. JP 2013-184582 A discloses a louver (13) placed between a front edge of a windshield (1) and a rear edge of a hood (2). The louver (13) has a vertical wall part (13b) which is bent in a chevron shape. The reference numerals described above in the parentheses are the reference numerals used in JP 2013-184582 A, and are unrelated to those described in the description of the embodiment of the present disclosure.

There remains room for improvement in the structure for absorbing shock from above the vehicle front part.

SUMMARY

According to one aspect of the present disclosure, there is provided a vehicle front part structure comprising: a front part upper surface outer plate member that is placed to cover an upper surface of a front part of a vehicle; and an inner member that is placed in an adjacent region of a front edge of a windshield and below the front part upper surface outer plate member, and that has a vertical wall which extends vertically from a vehicle body in an expected direction of a collision load. The vertical wall is bent at one location between an upper edge and a lower edge, and has a ridgeline formed on the bent portion and extending in a lateral direction of the vehicle, wherein the lower edge is fixed on the vehicle body, and a length from the ridgeline to the upper edge, and a length from the ridgeline to the lower edge, differ from each other.

Because the length from the ridgeline to the upper edge and the length from the ridgeline to the lower edge differ from each other, a bending position of the vertical wall moves during a deformation process of the vertical wall due to the collision load.

According to another aspect of the present disclosure, in the vehicle front part structure, the front part upper surface outer plate member may be a cowl top which is placed between a hood and the windshield, and the inner member may be a cowl louver which is placed below the cowl top. In this configuration, the vertical wall of the inner member is formed as a part of the cowl louver.

Because the bending position moves during the deformation process of the vertical wall due to the collision load, more energy due to the collision can be consumed and the shock can be absorbed to a greater extent, in comparison to a configuration in which the bending position does not move.

BRIEF DESCRIPTION OF DRAWINGS

Embodiment(s) of the present disclosure will be described based on the following figures, wherein.

DESCRIPTION OF EMBODIMENTS

Figure 1:
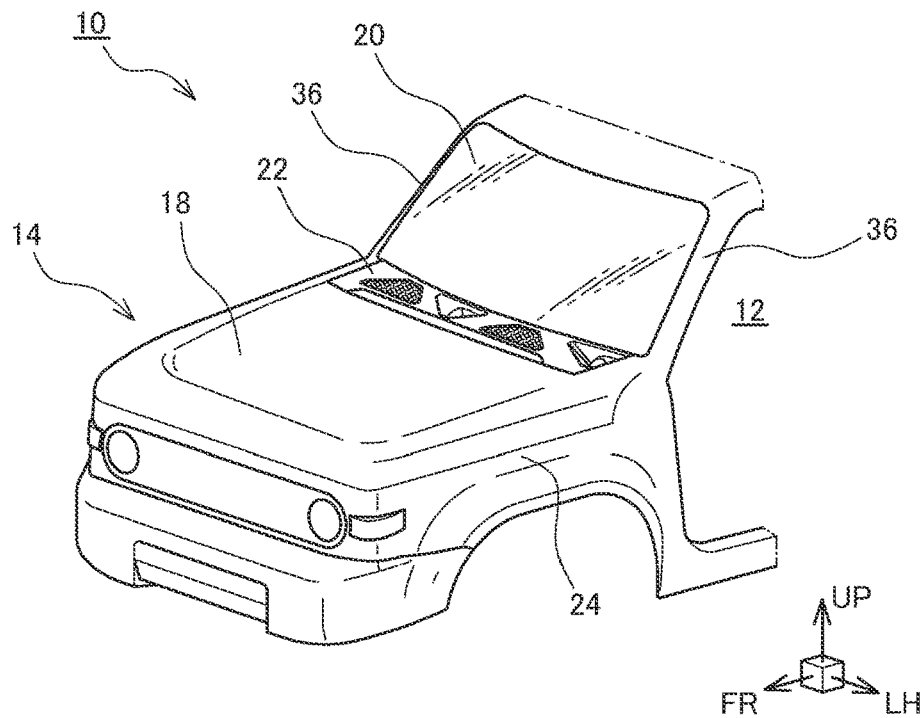
FIG. 1 is a perspective diagram showing a front part of a vehicle.

An embodiment of the present disclosure will now be described with reference to the drawings. In the following description, unless otherwise noted, terms representing relative positions, directions, and orientations such as front, frontward, rear, rearward, left, leftward, right, rightward, upper, upward, lower, and downward, refer to relative positions, directions, and orientations in relation to a vehicle. Further, a front-and-rear direction of the vehicle will be referred to as a longitudinal direction, a left-and-right direction will be referred to as a lateral direction, and an up-and-down direction will be referred to as a vertical direction. Moreover, a side, in the lateral direction of the vehicle (vehicle width direction), nearer to a center line which extends in the longitudinal direction of the vehicle will be referred to as an inner side in the vehicle width direction, a direction toward the center line will be referred to as an inward direction in the vehicle width direction, a side farther away from the center line will be referred to as an outer side in the vehicle width direction, and a direction away from the center line will be referred to as an outward direction in the vehicle width direction. In the drawings, a direction of an arrow FR shows a frontward direction, a direction of an arrow UP shows an upward direction, a direction of an arrow LH shows a leftward direction, and a direction of an arrow OUT shows an outward direction in the vehicle width direction.

FIG. 1 is a diagram showing a front part of a vehicle 10. The vehicle 10 has a front part vehicle body 14 in front of a passenger compartment 12 and independent from the passenger compartment 12, and the front part vehicle body 14 defines an engine compartment 16 (refer to FIG. 2) which houses a prime mover such as, for example, an engine (not shown). An upper surface of the front part vehicle body 14 is covered by a hood 18 and a cowl top 22 placed between the hood 18 and a windshield 20. In the vehicle 10, the hood 18 and the cowl top 22 are a front part upper surface outer plate member which covers the upper surface of the front part vehicle body 14. The hood 18 may be made of a steel plate, and the cowl top 22 may be made of a resin. The hood 18 can be opened and closed, and opening of the hood 18 enables access to the engine compartment 16 from above the engine compartment 16.

Figure 2:
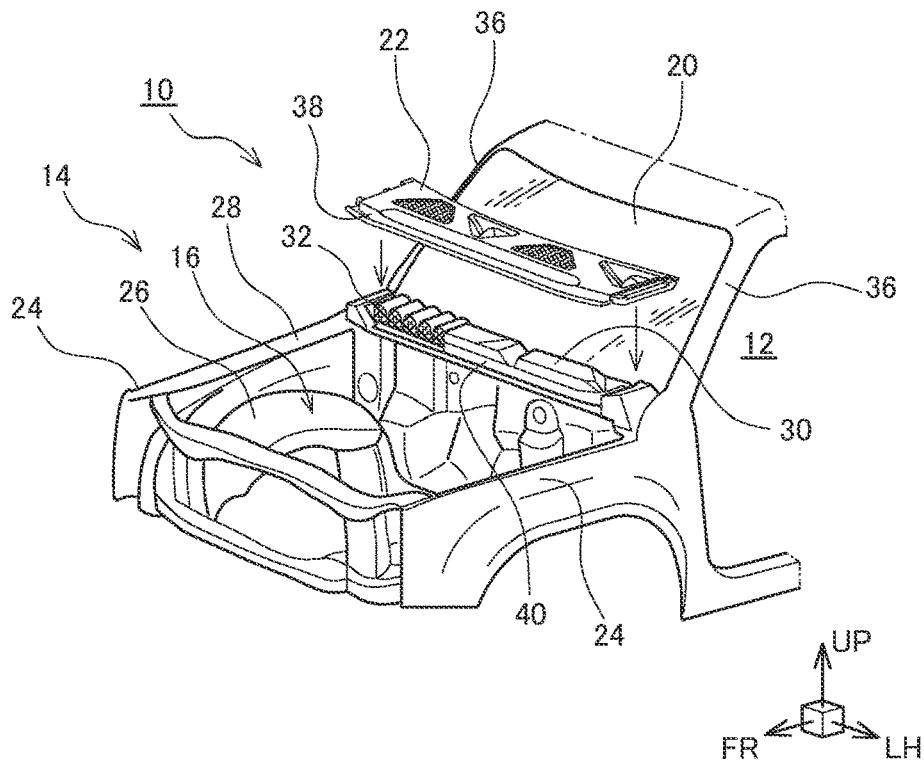
FIG. 2 is a perspective diagram showing a front part of a vehicle in a state in which a hood and a cowl top are removed.

FIG. 2 is a diagram showing a front part of the vehicle 10 in a state in which the hood 18 and the cowl top 22 are removed. A side surface structure at each of left and right of the front part vehicle body 14 includes a fender 24 positioned at an outer side in the vehicle width direction, and a fender apron 26 positioned at an inner side in the vehicle width direction. On an upper edge of the fender apron 26, an apron upper member 28 is provided, which is a skeleton member extending in the longitudinal direction. Below the cowl top 22, a cowl louver 30 is placed, which has a lateral dimension similar to the cowl top 22. The cowl louver 30 is an inner member positioned at an inner side of the vehicle body than the cowl top 22 positioned on a surface of the vehicle body. An outside air introduction opening 32 for introducing the outside air into the passenger compartment 12 is provided on the cowl louver 30. The cowl louver 30 is made of a resin. Further below the cowl louver 30, a cowl panel 34 (refer to FIG. 3) is placed, which is one of skeleton members of the vehicle body. The cowl panel 34 extends in the lateral direction, and has respective ends joined to left and right front pillars 36, or portions of the apron upper member 28 proximate the left and right front pillars 36.

Figure 3:
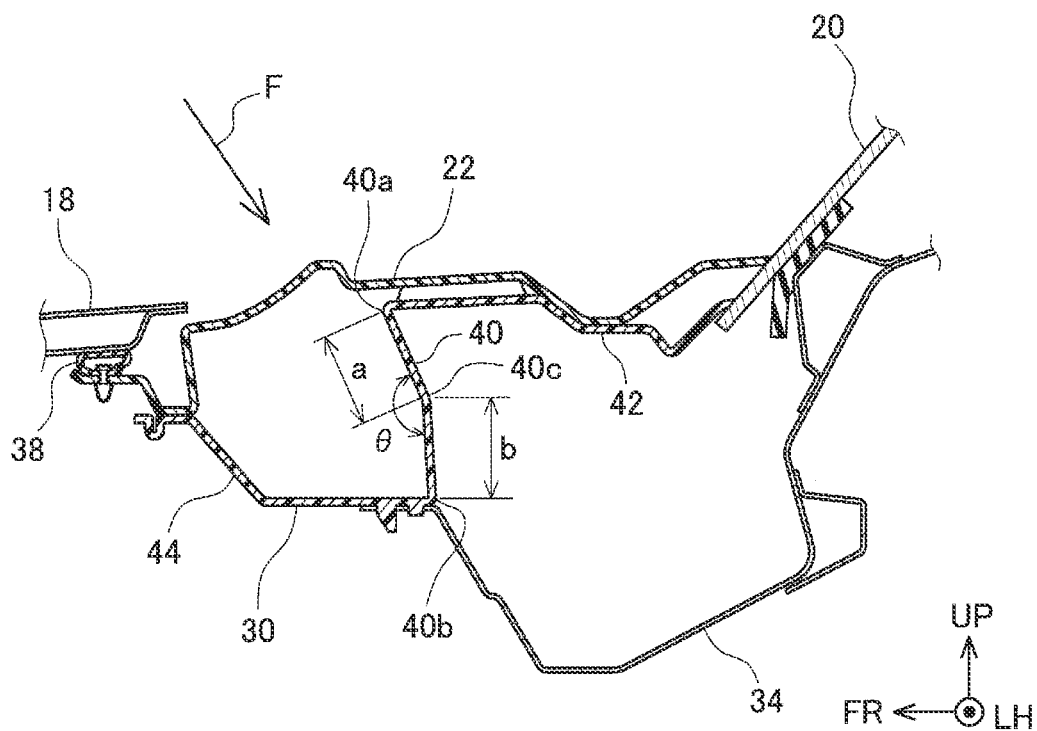
FIG. 3 is a diagram showing a cross section of a portion of a front part of a vehicle adjacent to a windshield.

FIG. 3 is a diagram showing a cross section, orthogonal to the lateral direction of the vehicle, of a structure of the cowl top 22 and the periphery thereof. The cowl panel 34 is made of a steel plate, is press-molded in a cross-sectional shape of an approximate U shape, and has a reinforcement member joined to a part of the cowl plate 34 by welding or the like, to form a closed cross-section structure. A rear edge of the cowl panel 34 supports a lower edge of the windshield 20. Because of the cross-sectional shape of the approximate U shape, the cowl panel 34 functions similar to a gutter, receives rainwater or the like flowing and falling off the windshield 20, and allows the rainwater or the like to flow to the left and to the right. A front edge of the cowl panel 34 supports the cowl louver 30.

The cowl louver 30 is supported by the cowl panel 34 from below, and has a rear edge mounted over the windshield 20 so as to be supported by the windshield 20. A front edge of the cowl louver 30 supports the cowl top 22. The cowl top 22 is further supported by the cowl louver 30 at a center portion in the longitudinal direction, and by the windshield 20 at a rear edge. On an upper surface of the front edge of the cowl top 22, a sealing member 38 for sealing a gap with the hood 18 is placed. The sealing member 38 is a tube made of rubber, and collapses by being sandwiched by the hood 18 and the cowl top 22, to thereby seal the gap.

At least a part of the cowl louver 30 in the lateral direction of the vehicle, in particular, a position expected to experience a load during a collision, has a cross-sectional shape of an approximately crank shape, as shown in FIG. 3. The cowl louver 30 has a vertical wall 40 at an approximate center portion in the longitudinal direction, a rearward plate 42 which extends rearward from an upper edge 40a of the vertical wall 40, and a frontward plate 44 which extends frontward from a lower edge 40b of the vertical wall 40. The frontward plate 44, the vertical wall 40, and the rearward plate 42 correspond to three sides forming the crank shape, respectively. The rearward plate 42 is placed approximately horizontally, supports the cowl top 22 from below, and has a rear edge mounted on a lower edge of the windshield 20, so as to be supported by the windshield 20. The frontward plate 44 extends horizontally toward the front side, and then toward a slanted upward direction, and supports the cowl top 22 with a front edge thereof. The frontward plate 44 is fixed to the cowl panel 34 at a rear edge thereof. The vertical wall extends vertically from a portion fixed to the cowl panel 34 in the upward direction.

The vertical wall 40 in particular extends vertically in an expected direction of a load F during collision of a head part of a pedestrian. The load direction F is a direction inclined slightly frontward from the vertical direction, and is inclined frontward, for example, by 30-40°. In correspondence with the frontward inclination of the load direction F, the vertical wall 40 is also inclined frontward. The vertical wall 40 is bent at one location between the upper edge 40a and the lower edge 40b, and thus has a cross-sectional shape of a chevron. With the bending, a ridgeline 40c is formed, which extends in the lateral direction approximately parallel to the upper edge 40a and the lower edge 40b. A bending angle θ of the vertical wall 40 may be 150-170°, and is 160° in the illustrated cowl louver 30.

The vertical wall 40 has two flat plate portions, with the ridgeline 40c as a boundary. A length a from the ridgeline 40c to the upper edge 40a, and a length b from the ridgeline 40c to the lower edge 40b, differ from each other (a≠b). The length a and the length b are respectively a width of the flat plate portion of the vertical wall 40 above the ridgeline 40c, and a width of the flat plate portion of the vertical wall 40 below the ridgeline 40c. Thus, the length a will hereinafter be referred to as an upper width a and the length b will hereinafter be referred to as a lower width b. A ratio of the upper width a and the lower width b may be less than or equal to 0.9 (a/b≤0.9), and may be greater than or equal to 0.7 and less than or equal to 0.9 (0.7≤a/b≤0.9). In the illustrated cowl louver 30, a/b is about 0.9. Alternatively, the upper width a may be set to be long, and the lower width b may be set to be short.

Figure 4:
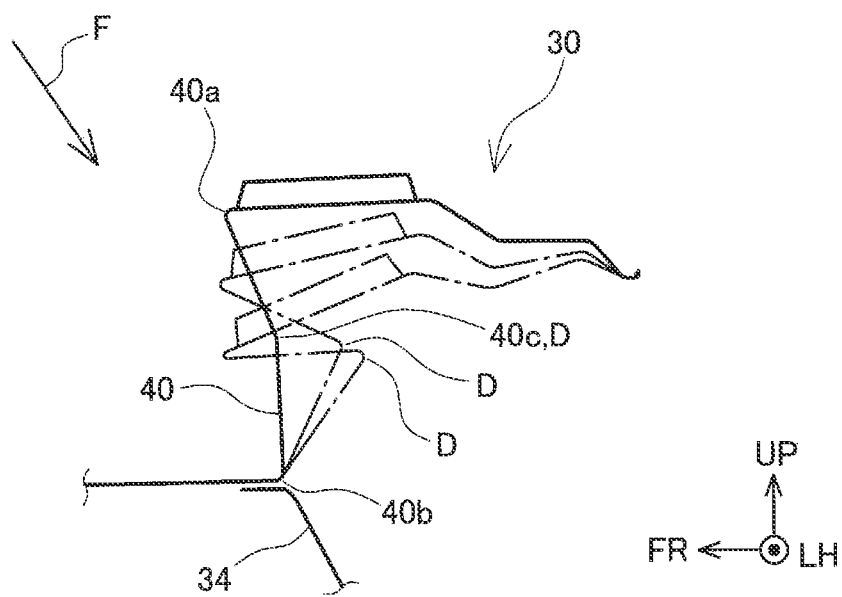
FIG. 4 is a diagram showing deformation of a cowl louver during collision.

FIG. 4 is a cross-sectional diagram of the cowl louver 30 at the same position as in FIG. 3, and shows deformation of the cowl louver 30 upon receiving the load F. A solid line shows a state before deformation, and a one-dot-and-chain line shows the deformation process and the shape after the deformation. In the deformation process, the upper edge 40a of the vertical wall moves toward the lower edge 40b fixed on the cowl panel 34. In this process, because the upper width a and the lower width b are unequal lengths, a bending line D moves on the vertical wall 40. At the start of the deformation, the deformation of the vertical wall 40 starts at the ridgeline 40c, and the bending line D at this point coincides with the ridgeline 40c. When the deformation progresses, the bending line D moves from the initial position at the ridgeline 40c, so that the upper width a and the lower width b become closer to equal lengths. Because of this, the portion of the vertical wall 40 which was bent is unbent, and a portion which was flat is bent. In other words, during the deformation process, the portion experiencing the deformation gradually moves, and the portion which is unbent and the portion which is bent continuously exist. Thus, the collision energy can be consumed continuously during the deformation process, and the shock can be absorbed to a greater degree. On the contrary, when the upper width a and the lower width b are equal to each other from the beginning, the bending line D does not move, and as a consequence, the energy consumption during the deformation process after the start of the deformation is low, and the overall amount of absorption of the shock is also low.

The cowl louver 30 of the present embodiment can absorb more shock during the collision by setting the upper width a and the lower width b of the vertical wall 40 not equal to each other.

In the embodiment described above, the vertical wall 40 having the shock absorbing function is placed on the cowl louver 30 positioned at an inner side of the cowl top 22. Alternatively, a shock absorbing structure similar to the vertical wall 40 may be provided on an inner member below the hood 18 corresponding to an expected input position of the load during the collision.

REFERENCE SIGNS LIST 10 vehicle, 14 front part vehicle body, 18 hood (front part upper surface outer plate member), 20 windshield, 22 cowl top (front part upper surface outer plate member), 30 cowl louver (inner member), 34 cowl panel, 40 vertical wall, 40*a* upper edge (of vertical wall), 40*b* lower edge (of vertical wall), 40*c* ridgeline (of vertical wall).

The invention claimed is:

1. A vehicle front part structure comprising:
a front part upper surface outer plate member that is placed to cover an upper surface of a front part of a vehicle; and
an inner member that is placed in an adjacent region of a front edge of a windshield and below the front part upper surface outer plate member, and that has a vertical wall which extends vertically from a lower edge adjacent a vehicle body to an upper edge toward an expected direction of a collision load, the vertical wall inclined from the lower edge to the upper edge toward a front of the vehicle in a vehicle longitudinal direction, wherein
the vertical wall is bent at one location between the upper edge and the lower edge, and has a ridgeline formed on the bent portion and extending in a lateral direction of the vehicle, wherein the lower edge is fixed on the vehicle body, and a length from the ridgeline to the upper edge, and a length from the ridgeline to the lower edge, differ from each other, which in conjunction with the inclination of the vertical wall toward the front of the vehicle allows the vertical wall to deform along a bending line that moves away from the ridgeline toward the longer one of the lengths when the collision load is applied on the vertical wall at the upper edge for energy absorption.

2. The vehicle front part structure according to claim 1, wherein
the front part upper surface outer plate member is a cowl top which is placed between a hood and the windshield,
the inner member is a cowl louver which is placed below the cowl top, and
the vertical wall is a part of the cowl louver.

3. The vehicle front part structure according to claim 1, wherein a ratio of the length between the ridgeline and the upper edge to the length between the ridgeline and the lower edge is less than or equal to 0.9 and greater than or equal to 0.7.

4. The vehicle front part structure according to claim 1, wherein the vertical wall has a bending angle at the ridgeline from 150° to 170°.

* * * * *